(12) United States Patent
Sugimoto et al.

(10) Patent No.: US 11,207,977 B2
(45) Date of Patent: Dec. 28, 2021

(54) AXLE DRIVE APPARATUS

(71) Applicant: KANZAKI KOKYUKOKI MFG. CO., LTD., Amagasaki (JP)

(72) Inventors: Hiroshi Sugimoto, Amagasaki (JP); Akihiro Ima, Amagasaki (JP); Toshifumi Yasuda, Amagasaki (JP)

(73) Assignee: KANZAKI KOKYUKOKI MFG. CO., LTD., Amagasaki (JP)

( * ) Notice: Subject to any disclaimer, the term of this patent is extended or adjusted under 35 U.S.C. 154(b) by 185 days.

(21) Appl. No.: 16/718,901

(22) Filed: Dec. 18, 2019

(65) Prior Publication Data

US 2020/0198464 A1 Jun. 25, 2020

(30) Foreign Application Priority Data

Dec. 25, 2018 (JP) .............................. JP2018-241144

(51) Int. Cl.
| | |
|---|---|
| *B60K 17/16* | (2006.01) |
| *B60K 17/04* | (2006.01) |
| *B62D 27/02* | (2006.01) |
| *B62D 11/04* | (2006.01) |

(Continued)

(52) U.S. Cl.
CPC .......... *B60K 17/043* (2013.01); *B60K 17/105* (2013.01); *B60K 17/16* (2013.01); *B62D 11/04* (2013.01); *B62D 27/023* (2013.01); *B60K 2025/005* (2013.01)

(58) Field of Classification Search
CPC .... B60K 17/043; B60K 17/16; B60K 17/105; B60K 2025/005; B62D 27/023; B62D 11/04
See application file for complete search history.

(56) References Cited

U.S. PATENT DOCUMENTS

| | | | |
|---|---|---|---|
| 6,926,111 B1 * | 8/2005 | Irikura ................... | A01D 34/64 180/234 |
| 8,381,853 B2 * | 2/2013 | Iwaki ........................ | B60L 7/24 180/65.285 |

(Continued)

FOREIGN PATENT DOCUMENTS

| | | | |
|---|---|---|---|
| EP | 2088023 A1 * | 8/2009 | ........... B60K 17/354 |
| EP | 2357107 B1 | 9/2012 | |

(Continued)

*Primary Examiner* — Jacob B Meyer
(74) *Attorney, Agent, or Firm* — Sterne, Kessler, Goldstein & Fox P.L.L.C.

(57) ABSTRACT

An axle drive apparatus of the present invention includes an adapter unit that has an adapter case connectable to an axle drive case while supporting a first motor, an adapter input member connected to an output shaft of the first motor by connection of the first motor to the adapter case, an adapter output member that is connected to an axle drive input member of the axle drive apparatus by connection of the adapter case to an axle drive case, and an adapter power transmission mechanism that operatively transmits the rotational power of the adapter input member to the adapter output member. The axle drive apparatus is connectable to a vehicle frame through an axle drive case side frame connecting part and an adapter case side frame connecting part respectively provided at the axle drive case and the adapter case.

10 Claims, 9 Drawing Sheets

(51) Int. Cl.
B60K 17/10 (2006.01)
B60K 25/00 (2006.01)

(56) References Cited

U.S. PATENT DOCUMENTS

| | | | |
|---|---|---|---|
| 2001/0050188 A1* | 12/2001 | Ima | B60K 17/342 180/22 |
| 2019/0219116 A1* | 7/2019 | Matsuura | B60T 1/062 |
| 2019/0230863 A1* | 8/2019 | Yasuda | B60T 1/005 |
| 2020/0122573 A1* | 4/2020 | Nishizawa | B60K 1/00 |
| 2020/0198464 A1* | 6/2020 | Sugimoto | B60K 17/043 |
| 2021/0053435 A1* | 2/2021 | Ito | B60K 6/485 |

FOREIGN PATENT DOCUMENTS

| | | | | |
|---|---|---|---|---|
| JP | 2011-161953 A | 8/2011 | | |
| WO | WO-2009059700 A2 * | 5/2009 | | B60K 6/36 |

* cited by examiner

AXLE DRIVE APPARATUS

TECHNICAL FIELD

The present invention relates to an axle drive apparatus for driving an axle by rotational power from a drive source.

BACKGROUND ART

The applicant of the present application has proposed an axle drive apparatus suitably usable in a utility vehicle or a working vehicle such as a riding lawn mower, wherein the axle drive apparatus includes an axle drive case, an axle input shaft supported by the axle drive case, and an axle drive power transmission mechanism that is accommodated in the axle drive case and operatively transmits the rotational power of the axle drive input shaft to the axle of the utility vehicle (JP2011-161953A, hereinafter referred to as Patent Document 1).

The above axle drive apparatus is configured such that a hydraulic motor or an electric motor that functions as a drive source is integrally attached to the axle drive apparatus.

Specifically, the axle drive case has an attachment surface to which a drive source such as a hydraulic motor or an electric motor can be attached, and by connecting the hydraulic motor or the electric motor to the attachment surface, the output shaft of the hydraulic motor or the electric motor is connected to the axle input shaft.

The axle drive case has a mount boss, and by connecting the axle drive case to the vehicle body shell of the utility vehicle via the mount boss, the axle drive apparatus provided with a drive source such as a hydraulic motor or an electric motor is attached to the utility vehicle.

The axle drive apparatus described in Patent Document 1 is advantageous in that the state of power transmission from the drive source to the axle drive power transmission mechanism can be checked without actually attaching the axle drive apparatus to the utility vehicle. However, the mount boss provided on the axle drive case needs to bear the weight of the drive source such as a hydraulic motor or an electric motor in addition to the weight of the axle drive apparatus itself and, therefore, the axle drive apparatus is problematic in that the weight load is concentrated on the mount boss.

SUMMARY OF THE INVENTION

The present invention has been conceived in view of the conventional art described above, and an object of the present invention is to provide an axle drive apparatus capable of attachment to and detachment from the vehicle frame of a utility vehicle or a working vehicle while supporting a first motor that functions as a drive source, and capable of effectively preventing concentration of weight load when attached to the vehicle frame.

In order to achieve the object, the present invention provides an axle drive apparatus including an axle drive case that includes an axle drive case side frame connecting part directly or indirectly connectable to a vehicle frame of a utility vehicle, an axle drive input member, an axle drive power transmission mechanism that is accommodated in the axle drive case and operatively transmits the rotational power of the axle drive input member to an axle of the utility vehicle, and an adapter unit, wherein the adapter unit has an adapter case, an adapter input member, an adapter output member, and an adapter power transmission mechanism that is accommodated in the adapter case and operatively transmits the rotational power of the adapter input member to the adapter output member; the adapter case has an axle drive case attachment flange connectable to an attachment surface of the axle drive case, a motor attachment flange to which a first motor functioning as a drive source for the axle is connectable, and an adapter case side frame connecting part directly or indirectly connectable to the vehicle frame; and the first motor is connected to the motor attachment flange in a state that an output shaft of the first motor is connected to the adapter input member, while the axle drive case attachment flange is connected to the attachment surface in a state that the adapter output shaft is connected to the axle drive input member.

The axle drive apparatus according to the present invention makes it possible to be detachably mounted to the vehicle frame of the utility vehicle while supporting the first motor functioning as the drive source for the axle, and furthermore to effectively prevent concentration of weight load in a state that the axle drive apparatus is attached to the vehicle frame.

Preferably, the axle drive case attachment flange may be configured to have the same shape as an attachment flange of a second motor capable of functioning as a drive source for the axle and different from the first motor.

The adapter power transmission mechanism may be configured to operatively transmit the rotational power of the adapter input member to the adapter output member at a predetermined transmission ratio.

For example, the predetermined transmission ratio of the adapter power transmission mechanism is set so that the rotational speed of the axle drive input member when driven by the rated output of the second motor directly connected to the attachment surface of the axle drive case and the rotational speed of the axle drive input member when driven by the rated output of the first motor that is operatively transmitted through the adapter power transmission mechanism are matched to each other.

In any one of the above various configurations, the axle drive power transmission mechanism may have a differential mechanism that differentially transmits the rotational power of the axle drive input member to the pair of right and left axles; in reference to the state where the axle drive apparatus is attached to the vehicle frame, the axle drive input member may be supported by the axle drive case at a position spaced apart from the differential mechanism in the vehicle longitudinal direction; and the axle drive case side frame connecting part may include vehicle longitudinal direction first and second connecting parts for connecting one side of the axle drive case that accommodates the differential mechanism and the other side of the axle drive case that supports the axle drive input member to the vehicle frame, respectively.

Preferably, the adapter case side frame connecting part and the vehicle longitudinal direction second connecting part may be provided with a vibration isolator.

DETAILED DESCRIPTION OF THE PREFERRED EMBODIMENTS

Below, one embodiment of the axle drive apparatus according to the present invention will now be described with reference to the appended drawings.

Figure 1:
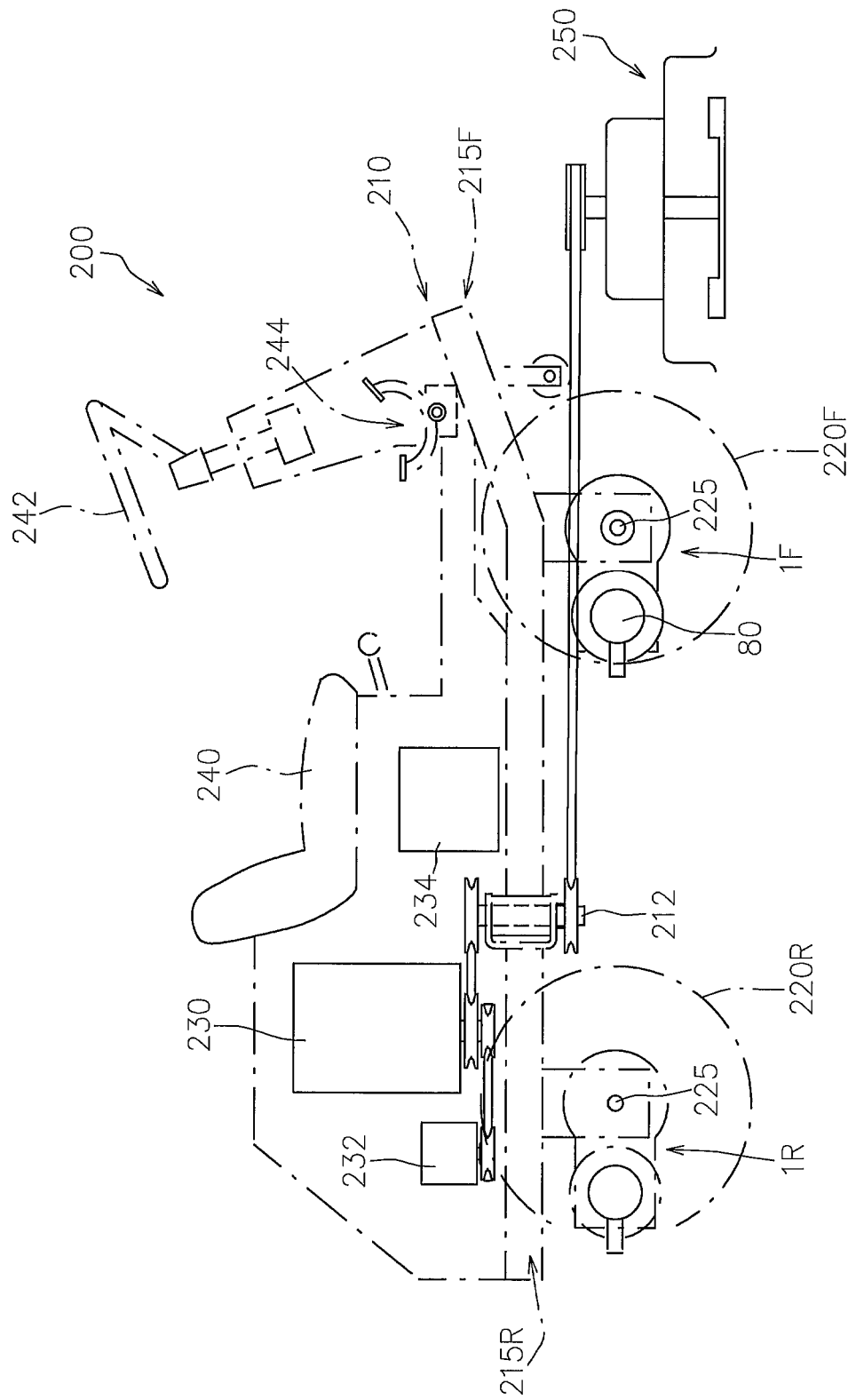
FIG. 1 is a side view of a utility vehicle to which an axle drive apparatus according to one embodiment of the present invention is applied.
Figure 2:
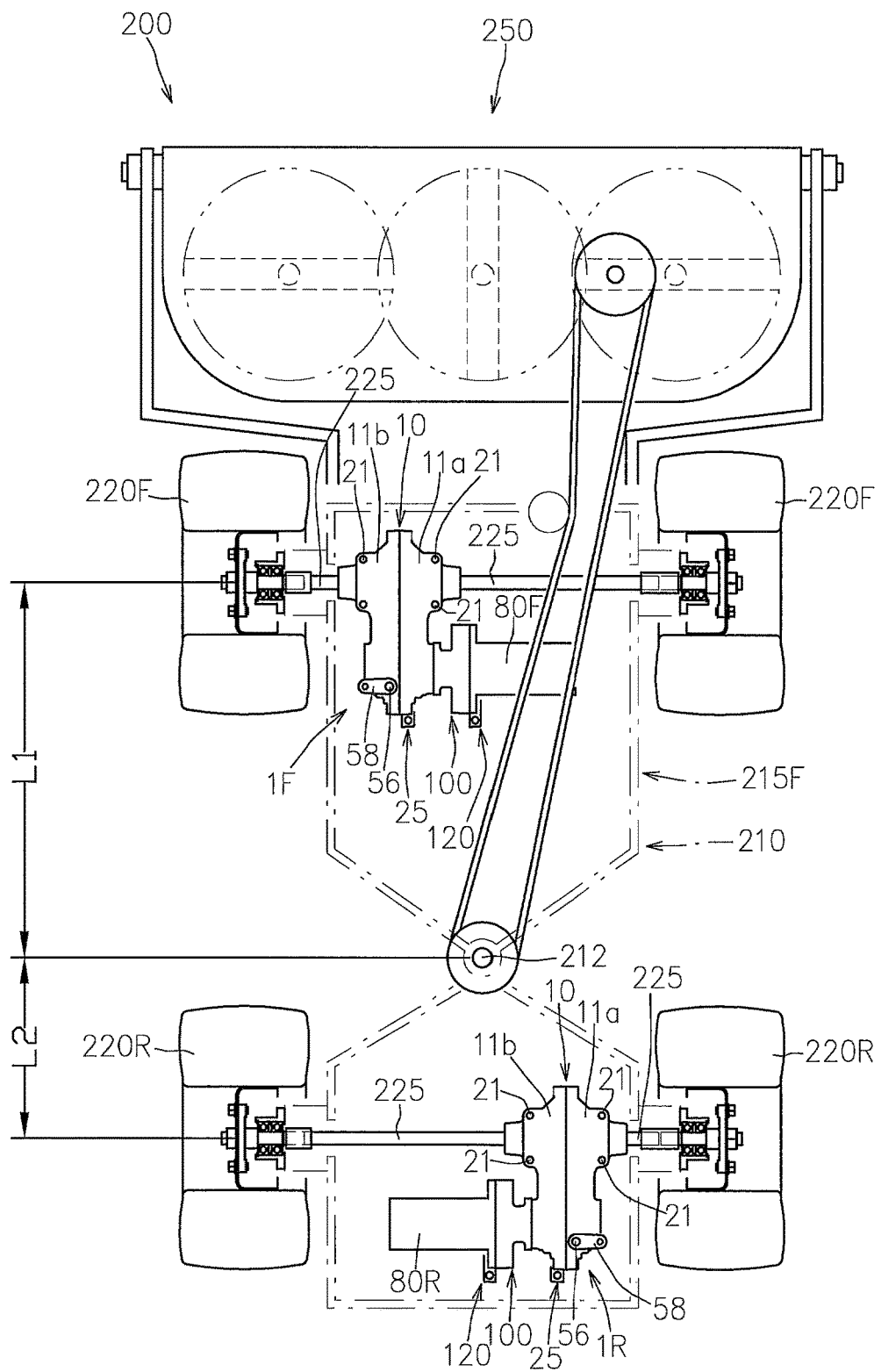
FIG. 2 is a plan view of the utility vehicle.

FIGS. 1 and 2 respectively show a side view and a plan view of one exemplary utility vehicle or working vehicle 200 to which an axle drive apparatus 1 according to the present embodiment is applied.

Figure 3:
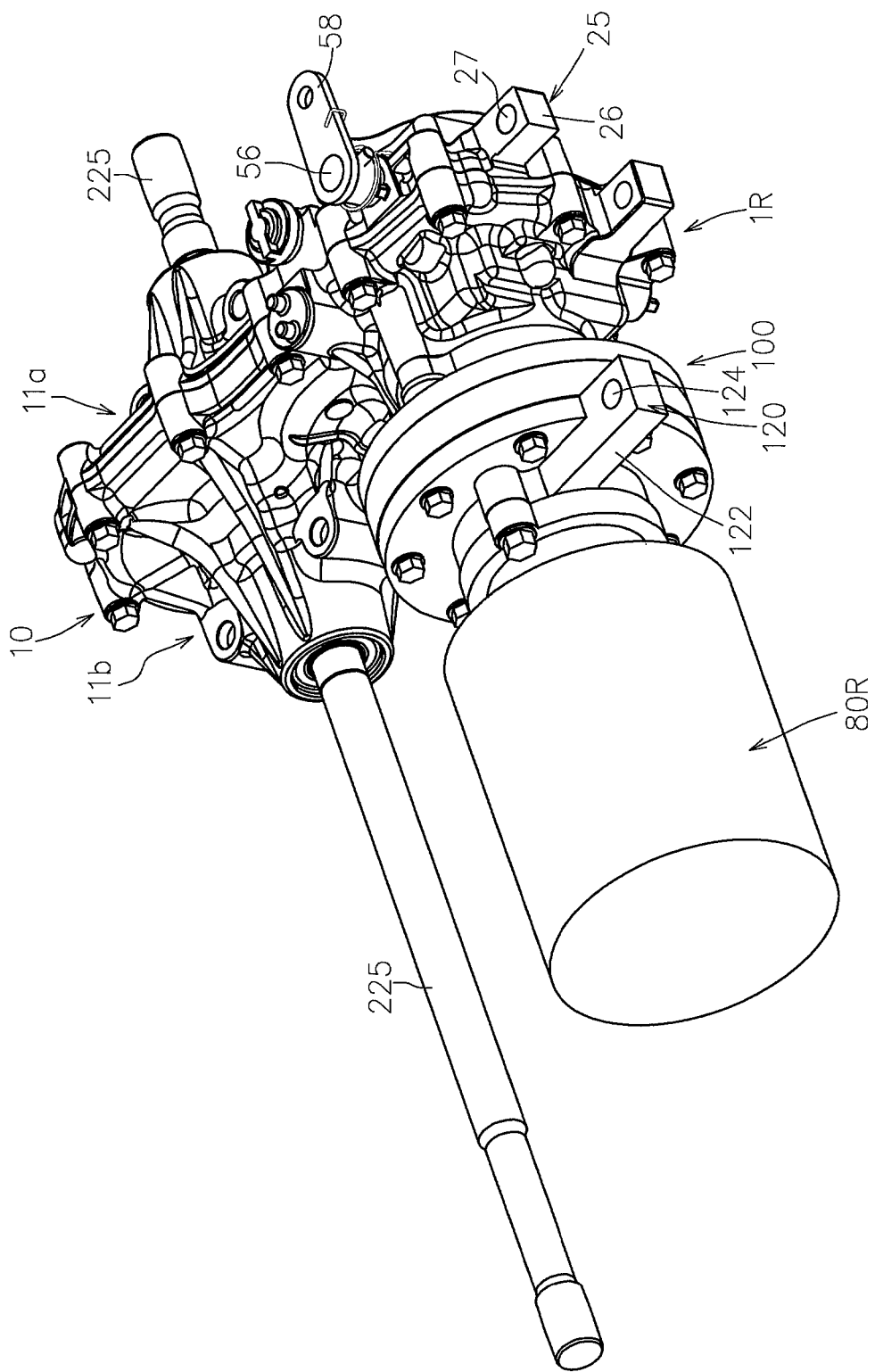
FIG. 3 is a perspective view the axle drive apparatus.
Figure 4:
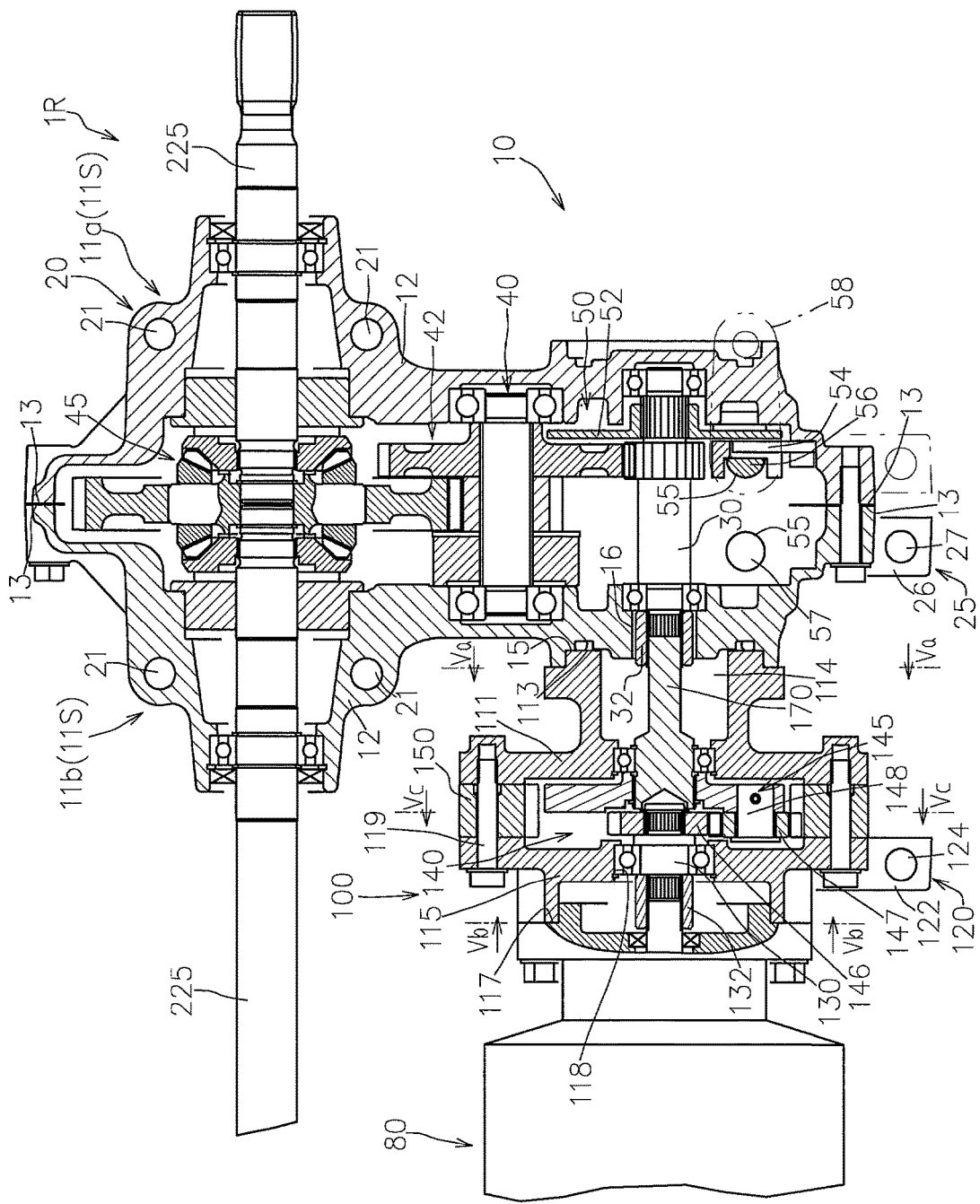
FIG. 4 is a transverse cross-sectional plan view of the axle drive apparatus.

FIGS. 3 and 4 respectively show a perspective view and a transverse cross-sectional plan view of the axle drive apparatus 1.

As shown in FIGS. 1 and 2, in the utility vehicle 200, the axle drive apparatus 1 includes a front wheel side axle drive apparatus 1F for driving front wheels 220F and a rear wheel side axle drive apparatus 1R for driving rear wheels 220R.

As shown in FIGS. 3 and 4, the axle drive apparatus 1 includes an axle drive case 10, an axle drive input member 30 for receiving rotational power operatively transmitted from a drive source, and an axle drive power transmission mechanism 40 that is accommodated in the axle drive case 10 and operatively transmits the rotational power of the axle drive input member 30 to an axle 225 of the utility vehicle 200 to which the axle drive apparatus 1 is applied.

In the present embodiment, the axle 225 includes a pair of right and left front axles 225F respectively connected to a pair of right and left front wheels 220F, and a pair of right and left rear axles 225R respectively connected to a pair of right and left rear wheels 220R.

In the present embodiment, the axle drive input member 30 is a shaft supported by the axle drive case 10 so as to be axially rotatable while being accessible from outside.

The axle drive power transmission mechanism 40 is configured to differentially transmit the rotational power of the axle drive input member 30 to the pair of right and left axles 225.

Specifically, the axle drive power transmission mechanism 40 has a differential mechanism 45, and is configured to differentially transmit the rotational power of the axle drive input member 30 to the pair of right and left axles 225 via the differential mechanism 45.

In the present embodiment, the axle drive power transmission mechanism 40 has an axle drive gear train 42 for transmitting the rotational power of the axle drive input member 30 to the differential mechanism 45.

In the present embodiment, the axle drive apparatus 1 further includes a brake mechanism 50 for directly or indirectly applying braking force to the axle drive input member 30.

The brake mechanism 50 includes a brake disc 52 incapable of relative rotation relative to the axle drive input member 30, a brake pad 54 disposed so as to face the brake disc 52, a brake control shaft 56 supported by a brake installation hole 55 provided in the axle drive case 10 so as to be axially rotatable, and a brake arm 58 supported by the outer end part of the brake control shaft 56.

As shown in FIG. 4, the brake control shaft 56 has an inner end part that is formed into a non-circular cross-sectional shape and is engaged with the back surface of the brake pad 54. The brake control shaft 56 is axially rotated so that the inner end part presses the brake pad 54 against the brake disc 52 to apply braking force to the axle drive input member 30.

The axle drive case 10 has first and second case halves 11a, 11b defining an accommodating space for accommodating the axle drive power transmission mechanism by being joined to each other.

Specifically, the case halves 11a, 11b each have an outer wall 12 defining a shell-like concaved inner space, and the free end surface of the outer wall 12 forms a joint surface 13.

That is, the first and second case halves 11a, 11b form an accommodating space for accommodating the axle drive power transmission mechanism 40 by being connected to each other such that the joint surfaces 13 are in contact with each other.

In the present embodiment, the first and second case halves 11a, 11b are formed by a pair of reference case halves 11S.

That is, one (hereinafter referred to as a first reference half) of the pair of reference case halves 11S, which forms the first case half 11a, is brought into a first orientation so that the joint surface 13 of the first reference case half 11S faces in a first direction (toward one side in the vehicle width direction in the present embodiment). The other (hereinafter referred to as a second reference half) of the pair of reference case halves 11S, which forms the second case half 11b, is brought into a second orientation that is vertically inverted from the first orientation without changing the orientation with respect to the front-rear direction so that the joint surface 13 of the second reference case half 11S faces in a second direction that is opposite to the first direction (toward the other side in the vehicle width direction in the present embodiment).

By fastening the first reference case half 11S that is in the first orientation and the second reference case half 11S that is in the second orientation to each other with fastening members such as bolts such that the joint surfaces 13 are joined together, the axle drive case 10 is formed.

The reference case half 11S has the brake installation hole 55 for the brake mechanism 50. The brake control shaft 56 is provided in the brake installation hole 55 of one of the first and second case halves 11a, 11b (the first case half 11a in the depicted embodiment), and the brake installation hole 55 in the other of the first and second case halves 11a, 11b (the second case half 11b in the depicted embodiment) is closed by a plug 57.

The axle drive apparatus 1 is configured to support a first motor 80 that functions as the drive source via an adapter unit 100.

That is, the axle drive apparatus 1 further includes the adapter unit 100.

In the present embodiment, an electric motor is used as the first motor 80.

As shown in FIGS. 3 and 4, the adapter unit 100 has an adapter case 110, an adapter input member 130, an adapter output member 170, and an adapter power transmission mechanism 140 that is accommodated in the adapter case 110 and operatively transmits the rotational power of the adapter input member 130 to the adapter output member 170.

The adapter case 110 is configured to be connected to the axle drive case 10 while supporting the first motor 80.

Figure 5A:
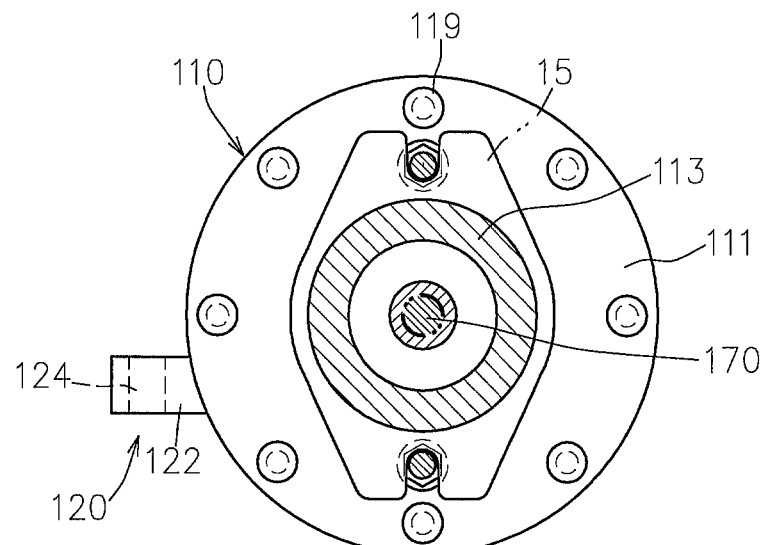
FIGS. 5A-5C are cross-sectional views taken along the lines Va-Va, Vb-Vb and Vc-Vc in FIG. 4, respectively.

FIG. 5A shows a cross-sectional view taken along the line Va-Va in FIG. 4.

Specifically, as shown in FIGS. 4 and 5A, the axle drive case 10 has an attachment surface 15.

As shown in FIG. 4, the attachment surface 15 has an adapter side access opening 16, and the axle drive input member 30 is supported by the axle drive case 10 so as to be axially rotatable while being accessible from outside via the adapter side access opening 16.

As described above, in the present embodiment, the axle drive case 10 has the first and second case halves 11a, 11b each formed from the reference case half 11S.

In this case, among the two reference case halves 11S, i.e., the first reference case half 11S forming the first case half 11a and the second reference case half 11S forming the second case half 11b, the access opening 16 is formed only in one reference case half 11S that requires the access opening 16 (in the depicted embodiment, the second reference case half 11S that forms the second case half 11b), and the access opening 16 is not formed in the other reference case half 11S (in the depicted embodiment, the first reference case half 11S that forms the first case half 11a).

Figure 5B:
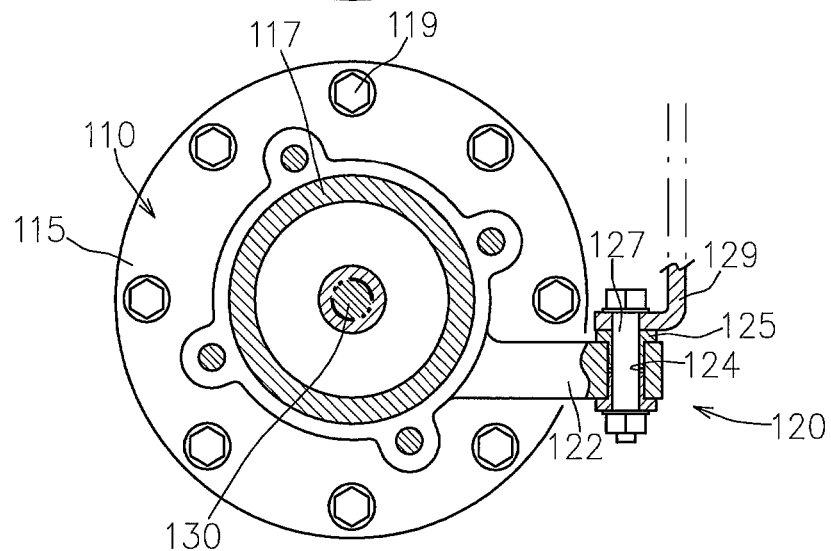

FIG. 5B shows a cross-sectional view taken along the line Vb-Vb in FIG. 4.

As shown in FIGS. 4, 5A, and 5B, the adapter case 110 has an axle drive case attachment flange 113 connectable to the attachment surface 15 of the axle drive case 10 and a motor attachment flange 117 to which the first motor 80 is connectable.

As shown in FIG. 4, in the present embodiment, the adapter case 110 has an axle case side case body 111 provided with the axle drive case attachment flange 113 and a motor side case body 115 provided with the motor attachment flange 117, and the case bodies 111, 115 are connected to each other by fastening members 119.

The motor attachment flange 117 has a motor side access opening 118 and, by connecting the first motor 80 to the adapter case 110 in a state that the first motor 80 is in contact with the motor attachment flange 117, the output shaft of the first motor 80 is connected to the adapter input member 130 via the motor side access opening 118.

The axle drive case attachment flange 113 has an axle drive case side access opening 114.

By connecting the adapter case 110 to the axle drive case 10 in a state that the axle drive case attachment flange 113 is in contact with the attachment surface 15, the adapter output shaft 170 is connected to the axle drive input member 30 via the axle drive case side access opening 114 and the adapter side access opening 16.

In the present embodiment, the adapter input member 130 and the adapter output member 170 are shafts that are rotationally driven around the axis, the adapter input member 130 is connected to the output shaft of the first motor 80 via a coupling 132 so as to be incapable of relative rotation around the axis, and the adapter output shaft 170 is connected to the axle drive input member 30 via a coupling 32 so as to be incapable of relative rotation around the axis.

In the present embodiment, the axle drive case attachment flange 113 has the same shape as an attachment flange 92 of a second motor 90 (see FIG. 6 below) that is capable of functioning as a drive source for the axle 225 and is different from the first motor 80.

According to this configuration, the axle drive case 10, the axle drive input member 30, and the axle drive power transmission mechanism 40 can be used both when the first motor 80 is used as a drive source for driving the axle 225 and when the second motor 90 is used as a drive source for driving the axle 225.

Figure 6:
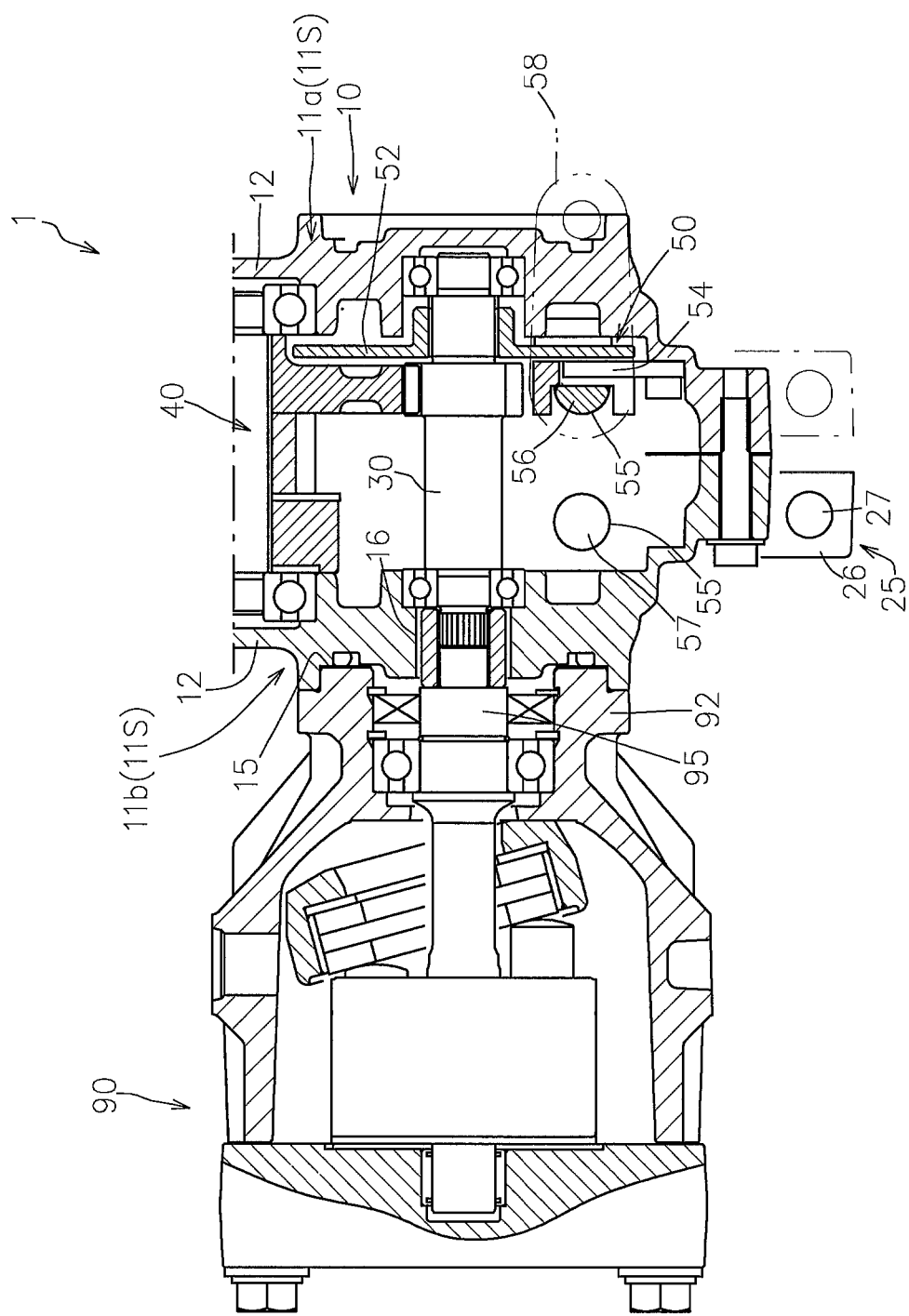
FIG. 6 is a partial transverse cross-sectional plan view wherein a different motor is connected to the axle drive case of the axle drive apparatus.

FIG. 6 is a partial transverse cross-sectional plan view wherein the second motor 90 is connected to the axle drive case 10.

In the example shown in FIG. 6, a hydraulic motor is used as the second motor 90.

That is, by connecting the second motor 90 to the axle drive case 10 in a state that the attachment flange 92 of the second motor 90 is in contact with the attachment surface 15, the output shaft 95 of the second motor 90 is connected to the axle drive input member 30 via the adapter side access opening 16 by the coupling 32 so as to be incapable of relative rotation around the axis.

Thus, when the second motor 90 is set to be used by being directly connected to the axle drive case 10, the power transmission ratio or gear ratio of the axle drive power transmission mechanism 40 may be set such that the axle 225 is rotated at a necessary rotational speed in accordance with the rated output rotational speed of the second motor 90.

In a case where the power transmission ratio of the axle drive transmission mechanism 40 is set in accordance with the rated output rotational speed of the second motor 90, the adapter power transmission mechanism 140 is set to such a power transmission ratio that the rotational speed of the axle drive input member 30 when driven by the rated output of the first motor 80 substantially matches the rotational speed of the axle drive input member 30 when driven by the rated output of the second motor 90.

Figure 5C:
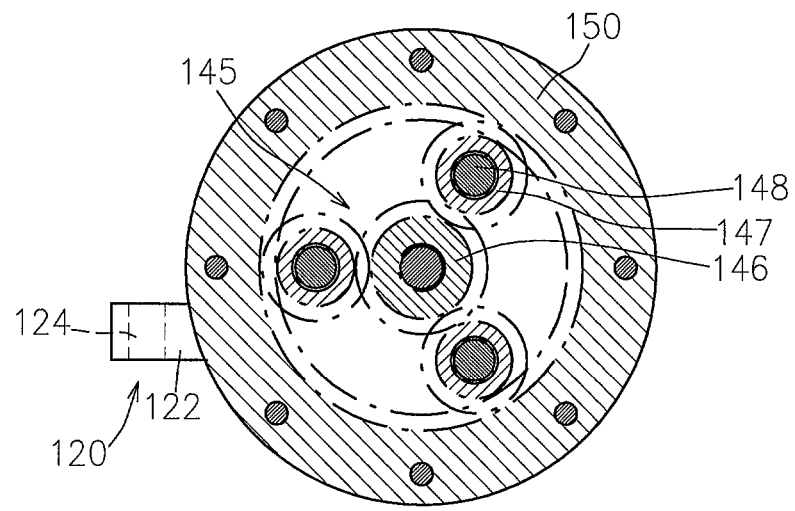

FIG. 5C shows a cross-sectional view taken along the line Vc-Vc in FIG. 4.

As shown in FIGS. 4 and 5C, in the present embodiment, the adapter power transmission mechanism 140 has a planetary gear mechanism 145.

Specifically, the planetary gear mechanism 145 has a sun gear 146, planetary gears 147 meshed with the sun gear 146, a carrier 148 that rotates around the axis of the sun gear 146 in accordance with the revolution of the planetary gears 147 around the sun gear 146 while supporting the planetary gears 147 so as to be capable of axial rotation, and an internal gear 150 meshed with the planetary gears 147.

In the present embodiment, as shown in FIGS. 4 and 5C, the sun gear 146 functions as an input element connected to the adapter input member 130, the carrier 148 functions as an output element connected to the adapter output member 170, and the internal gear 150 functions as a fixed element fixed so as to be incapable of rotation.

In the depicted embodiment, the internal gear 150 is sandwiched between the axle case side case body 111 and the motor side case body 115, and forms a part of the adapter case 110.

Figure 7:
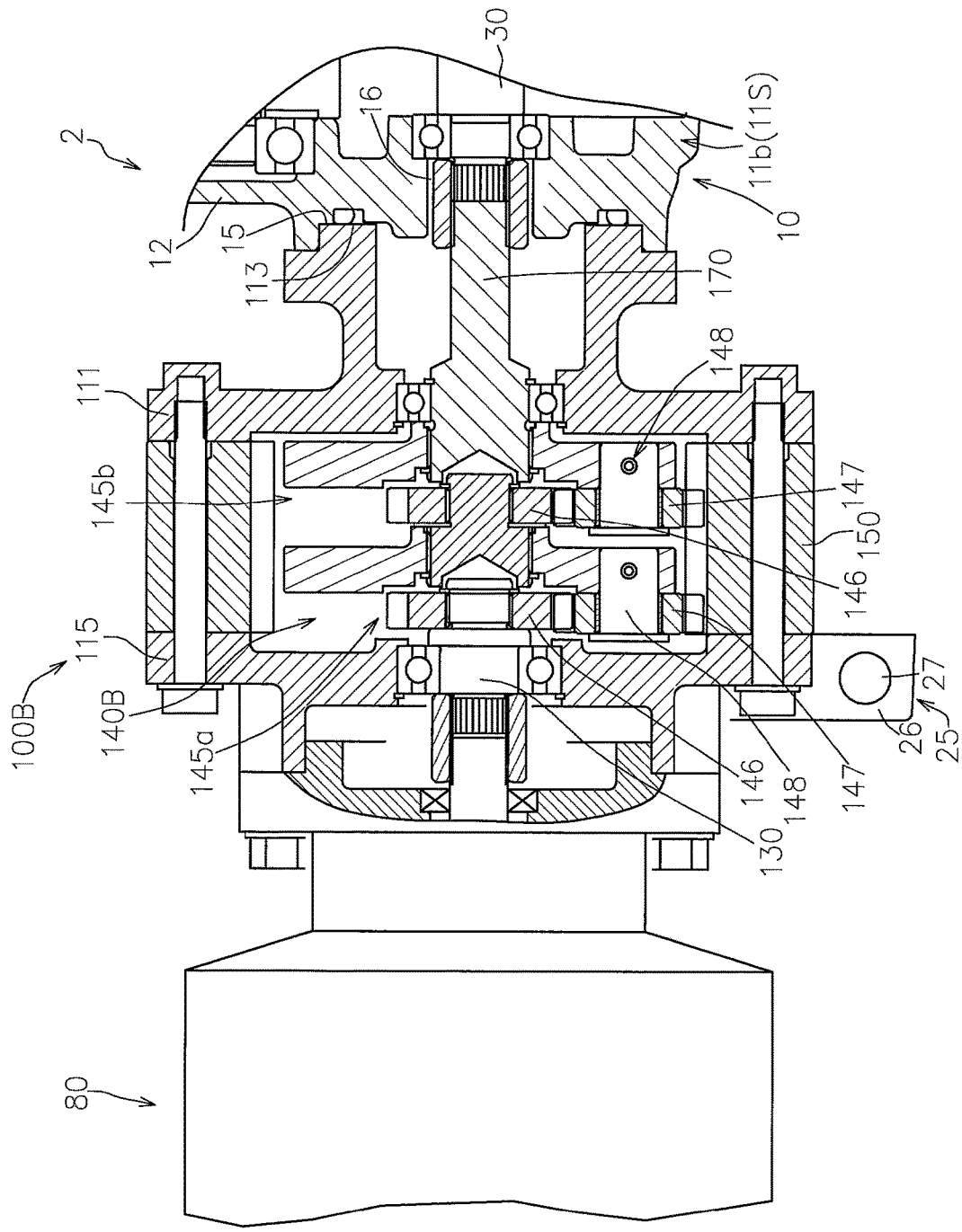
FIG. 7 is a cross-sectional view of an axle drive apparatus according to a modification of the embodiment.

FIG. 7 shows a cross-sectional view of an axle drive apparatus 2 according to a modification of the present embodiment.

The axle drive apparatus 2 according to the modification is different from the axle drive apparatus 1 only in that the axle drive apparatus 2 has an adapter unit 100B in place of the adapter unit 100.

Compared with the adapter unit 100, the adapter unit 100B has an adapter power transmission mechanism 140B in place of the adapter power transmission mechanism 140.

As shown in FIG. 7, the adapter power transmission mechanism 140B has first and second planetary gear mechanisms 145a, 145b that are disposed in series.

That is, the sun gear 146 of the first planetary gear mechanism 145a is connected to the adapter input member 130, the carrier 148 of the first planetary gear mechanism 145a is connected to the sun gear 146 of the second planetary gear mechanism 145b, and the carrier 148 of the second planetary gear mechanism 145b is connected to the adapter output member 170.

As shown in FIG. 7, the internal gears 150 of the first and second planetary gear mechanisms 145a, 145b are both fixed elements, and are formed of a single fixed member sandwiched between the axle case side case body 111 and the motor side case body 115.

As shown in FIGS. 2 and 4, the axle drive case 10 has an axle drive case side frame connecting part 20 directly or indirectly connectable to a vehicle frame 210 of the utility vehicle 200 to which the apparatus is applied.

In the present embodiment, in reference to the state where the axle drive case 10 is attached to the vehicle frame 210, the axle drive case 10 is configured to accommodate the differential mechanism 45 at the same position as the axle 225 with respect to the vehicle longitudinal direction and support the axle drive input member 30 at a position spaced apart from the differential mechanism 45 in the vehicle longitudinal direction.

In this configuration, the axle drive case side frame connecting part 20 includes a vehicle longitudinal direction first connecting part 21 and a vehicle longitudinal direction second connecting part 25 for connecting one side of the axle drive case 10 that accommodates the differential mechanism 45 and the other side of the axle drive case 10 that supports the axle drive input member 30 to the vehicle frame 210, respectively.

Thus, the axle drive case side frame connecting part 20 includes the vehicle longitudinal direction first and second connecting parts 21 and 25 that are spaced apart from each other, whereby the axle drive case 10 can be stably mounted to the vehicle frame 210.

As shown in FIG. 4, in the present embodiment, the vehicle longitudinal direction first connecting part 21 has four mount holes formed in the outer wall 12 of the axle drive case 10 such that the mount holes are disposed on the front, rear, right, and left sides relative to the center of the differential mechanism 45 as viewed from above.

The vehicle longitudinal direction second connecting part 25 has an arm 26 extending from the outer wall 12 of the axle drive case 10 and a mount hole 27 provided in the arm 26.

As shown in FIGS. 2, 4 and 5A to 5C, the adapter case 110 has an adapter case side frame connecting part 120 directly or indirectly connectable to the vehicle frame 210.

The adapter case side frame connecting part 120 has an arm 122 extending from the outer wall of the adapter case 110 and a mount hole 124 provided in the arm 122.

Thus, the axle drive apparatus 1 according to the present embodiment can be connected to the vehicle frame 210 also by the adapter case side frame connecting part 120 provided in the adapter case 110 in addition to the axle drive case side frame connecting part 20 provided in the axle drive case 10, thereby enabling the weights of the axle drive apparatus 1 and the first motor 80 to be supported at different points.

In the axle drive apparatus 1, the vehicle longitudinal direction first and second connecting parts 21, 25 are spaced apart from each other in the vehicle longitudinal direction and, moreover, the adapter case side frame connecting part 120 is provided between the vehicle longitudinal direction second connecting part 25 and the first motor 80 in the vehicle width direction.

According to this configuration, the loosening or the rotating of the axle drive apparatus 1 can be prevented without difficulty.

As shown in FIG. 5B, a rubber vibration isolator 125 is provided in the mount hole 124 of the adapter case side frame connecting part 120, and an attachment stay 129 attached to the vehicle frame 210 is connected to the arm 122 by a fastening member 127 inserted into the mount hole 124 via the rubber vibration isolator 125.

A similar rubber vibration isolator (not shown) is also provided in the mount hole 27 of the vehicle longitudinal direction second connecting part 25, an attachment stay (not shown) attached to the vehicle frame 210 is connected to the arm 26 by a fastening member (not shown) inserted into the mount hole 27 via the rubber vibration isolator.

Thus, by providing the rubber vibration isolator 125 in the mount hole 27 of the vehicle longitudinal direction second connecting part 25 and in the mount hole 124 of the adapter case side frame connecting part 120, the vibration and noise of the axle drive apparatus 1 attached to the vehicle frame 210 can be reduced.

Below, the configuration of one exemplary utility vehicle 200 to which the axle drive apparatus 1 according to the present embodiment is applicable will now be described.

As shown in FIGS. 1 and 2, the utility vehicle 200 has the vehicle frame 210, the front and rear wheels 220F, 220R, the front wheel side axle drive apparatus 1F supported by the vehicle frame 210 so as to drive the front wheels 220F, the rear wheel side axle drive apparatus 1R supported by the vehicle frame 210 so as to drive the rear wheels 220R, an engine 230 supported by the vehicle frame 210, a generator 232 driven by the engine 230, and a battery 234 that stores electric power generated by the generator 232 and functions as a power source for the first motor 80 of the front wheel side axle drive apparatus 1F (hereinafter referred to as a front wheel side first motor 80F) and for the first motor 80 of the rear wheel side axle drive apparatus 1R (hereinafter referred to as a rear wheel side first motor 80R).

In the present embodiment, the utility vehicle 200 is a riding lawn mower and, as shown in FIG. 1, in addition to having the above configuration, the utility vehicle 200 has a driver's seat 240, a steering member 242, a traveling member 244, and a mower unit 250 supported by the vehicle frame 210 so as to be rotationally driven by rotational power from the engine 230.

In the present embodiment, the body frame 210 is an articulated type.

That is, as shown in FIGS. 1 and 2, the vehicle frame 210 has a front frame 215F and a rear frame 215R connected so as to be pivotable around a substantially upright pivot shaft 212, and the front wheel side and rear wheel side axle drive apparatuses 1F, 1R are supported by the front frame 215F and the rear frame 215R, respectively.

Figure 8:
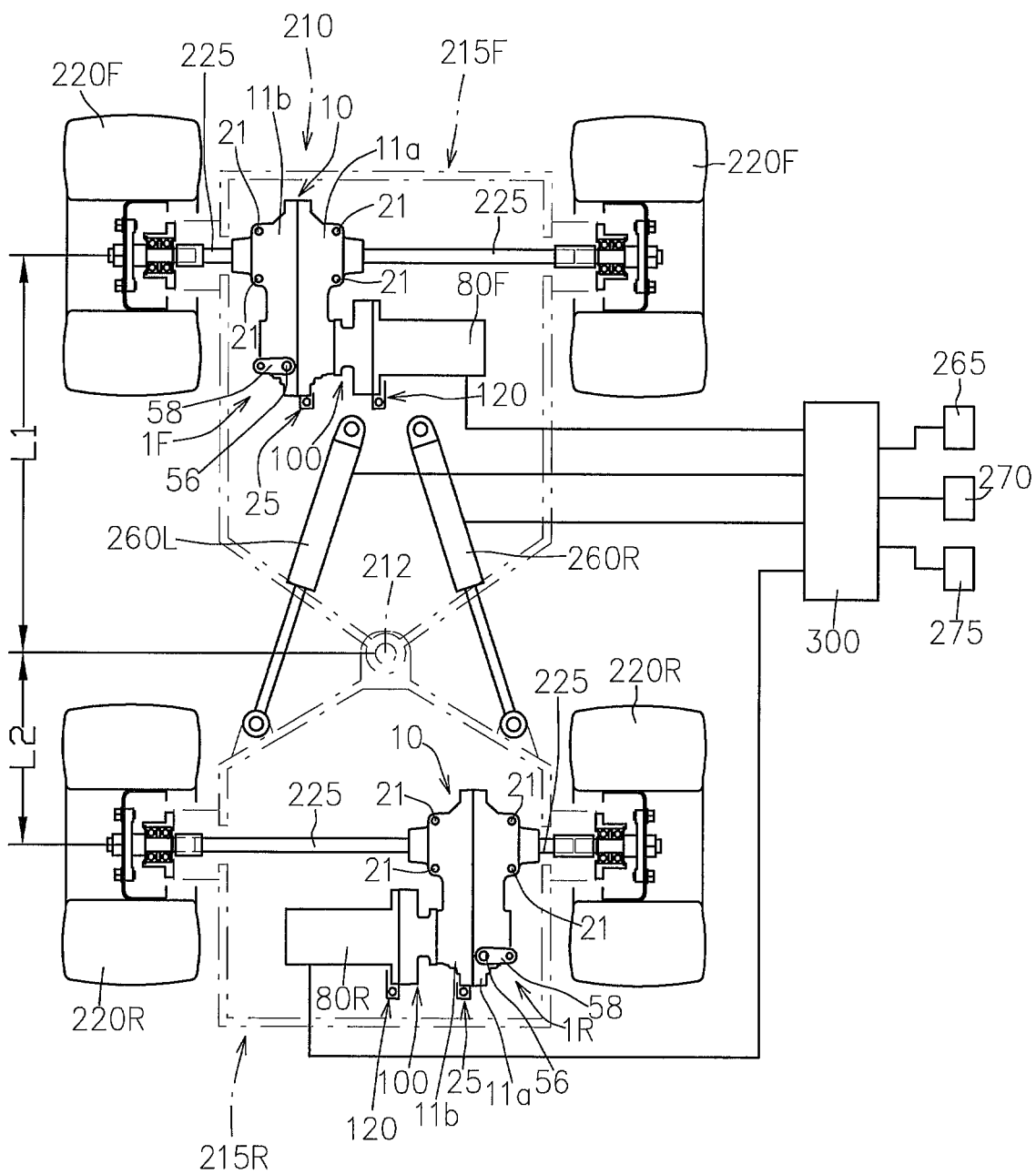
FIG. 8 is a control block diagram of the utility vehicle.

FIG. 8 shows a control block diagram of the utility vehicle 200.

As shown in FIGS. 1 and 8, the utility vehicle 200 further includes a pair of right and left electric linear actuators 260R, 260L for causing the front frame 215F and the rear frame 215R to be relatively rotated around the pivot shaft 212, a steering sensor 265 for detecting the amount of operation of the steering member 242, a traveling sensor 270 for detecting the amount of operation of the traveling member 244, and a control apparatus 300 responsible for operational control of the front wheel side and rear wheel side first motors 80F, 80R and the pair of right and left electric linear actuators 260R, 260L.

The control apparatus 300 varies the output rotational directions and the output rotational speeds of the front wheel side and rear wheel side first motors 80F, 80R in accordance with the amount of operation of the traveling member 244 detected by the traveling sensor 270.

In the embodiment shown in FIG. 1, the traveling member 244 is a seesaw pedal that can be depressed in both forward and backward directions.

In this case, the traveling sensor 270 detects the direction and amount of depression of the seesaw pedal.

That is, when the seesaw pedal 244 is depressed forward, the traveling sensor 270 detects the direction and amount of depression thereof, and the control apparatus 300 performs operational control on the front wheel side and rear wheel side first motors 80F, 80R such that the front wheel side and rear wheel side first motors 80F, 80R output forward rotational power at a speed corresponding to the detection value of the traveling sensor 270.

When the seesaw pedal 244 is depressed backward, the traveling sensor 270 detects the direction and amount of depression thereof, and the control apparatus 300 performs operational control on the front wheel side and rear wheel side first motors 80F, 80R such that the front wheel side and rear wheel side first motors 80F, 80R output backward rotational power at a speed corresponding to the detection value of the traveling sensor 270.

The control apparatus 300 performs operational control on the right and left electric linear actuators 260R, 260L in accordance with the direction and amount of operation of the steering member 242 detected by the steering sensor 265.

Moreover, in the present embodiment, the control apparatus 300 is configured to differentially control the front wheel side first motor 80F and the rear wheel side first motor 80R in accordance with the steering angle (the vehicle turning angle) when the vehicle turns.

That is, as shown in FIGS. 2 and 8, in the utility vehicle 200, a vehicle longitudinal direction length L1 between the front wheels 220F and the pivot shaft 212 is greater than a vehicle longitudinal direction length L2 between the rear wheels 220R and the pivot shaft 212.

Figure 9:
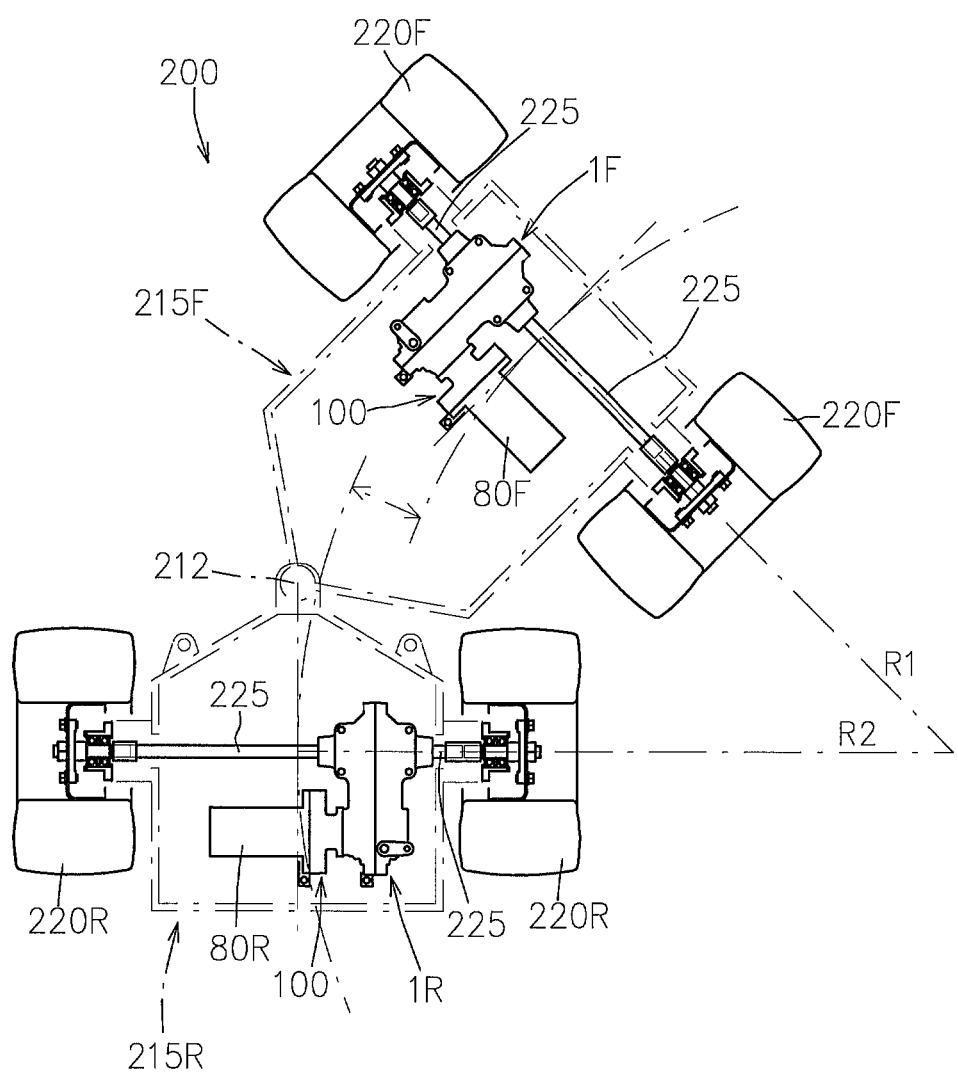
FIG. 9 is a plan view of the utility vehicle in turning.

In the utility vehicle 200 thus configured, as shown in FIG. 9, a turning radius R1 of the front wheels 220F is smaller than a turning radius R2 of the rear wheels 220R, and the difference between the turning radius R1 of the front wheels 220F and the turning radius R2 of the rear wheels 220R increases as the steering angle increases.

In view of this point, the utility vehicle 200 is configured so as to synchronize the output rotational speeds of the front wheel side first motor 80F and the rear wheel side first motor 80R when the vehicle travels straight, and provide a difference between the output rotational speed of the front wheel side first motor 80F and the output rotational speed of the rear wheel side first motor 80R in accordance with the steering angle when the vehicle turns, and is thus configured so as to absorb the difference between the turning radius R1 of the front wheels 220F and the turning radius R2 of the rear wheels 220R.

The reference number 275 in FIG. 8 is a 4WD/2WD selector switch, and the control apparatus 300 is configured to switch between a 4WD state and a 2WD state in accordance with the operation of the selector switch 275.

The invention claimed is:

1. An axle drive apparatus comprising an axle drive case that includes an axle drive case side frame connecting part directly or indirectly connectable to a vehicle frame of a utility vehicle, an axle drive input member, an axle drive power transmission mechanism that is accommodated in the axle drive case and operatively transmits the rotational power of the axle drive input member to an axle of the utility vehicle, and an adapter unit, wherein the adapter unit has an adapter case, an adapter input member, an adapter output member, and an adapter power transmission mechanism that is accommodated in the adapter case and operatively transmits the rotational power of the adapter input member to the adapter output member;

the adapter case has an axle drive case attachment flange connectable to an attachment surface of the axle drive case, a motor attachment flange to which a first motor functioning as a drive source for the axle is connectable, and an adapter case side frame connecting part directly or indirectly connectable to the vehicle frame; and the first motor is connected to the motor attachment flange in a state that an output shaft of the first motor is connected to the adapter input member, while the axle drive case attachment flange is connected to the attachment surface in a state that the adapter output shaft is connected to the axle drive input member.

2. The axle drive apparatus according to claim 1, wherein the axle drive case attachment flange has the same shape as an attachment flange of a second motor that is capable of functioning as a drive source for the axle and is different from the first motor.

3. The axle drive apparatus according to claim 1, wherein the adapter power transmission mechanism operatively transmits the rotational power of the adapter input member to the adapter output member at a predetermined transmission ratio.

4. The axle drive apparatus according to claim 2, wherein the adapter power transmission mechanism operatively transmits the rotational power of the adapter input member to the adapter output member at a predetermined transmission ratio.

5. The axle drive apparatus according to claim 1, wherein
the axle drive power transmission mechanism has a differential mechanism that differentially transmits the rotational power of the axle drive input member to a pair of right and left axles;
in reference to the state where the axle drive apparatus is attached to the vehicle frame, the axle drive input member is supported by the axle drive case at a position spaced apart from the differential mechanism in the vehicle longitudinal direction; and
the axle drive case side frame connecting part includes vehicle longitudinal direction first and second connecting parts for connecting one side of the axle drive case that accommodates the differential mechanism and the other side of the axle drive case that supports the axle drive input member to the vehicle frame, respectively.

6. The axle drive apparatus according to claim 5, wherein the adapter case side frame connecting part and the vehicle longitudinal direction second connecting part are provided with a vibration isolator.

7. The axle drive apparatus according to claim 2, wherein
the axle drive power transmission mechanism has a differential mechanism that differentially transmits the rotational power of the axle drive input member to a pair of right and left axles;
in reference to the state where the axle drive apparatus is attached to the vehicle frame, the axle drive input member is supported by the axle drive case at a position spaced apart from the differential mechanism in the vehicle longitudinal direction; and
the axle drive case side frame connecting part includes vehicle longitudinal direction first and second connecting parts for connecting one side of the axle drive case that accommodates the differential mechanism and the other side of the axle drive case that supports the axle drive input member to the vehicle frame, respectively.

8. The axle drive apparatus according to claim 7, wherein the adapter case side frame connecting part and the vehicle longitudinal direction second connecting part are provided with a vibration isolator.

9. The axle drive apparatus according to claim 3, wherein
- the axle drive power transmission mechanism has a differential mechanism that differentially transmits the rotational power of the axle drive input member to a pair of right and left axles;
- in reference to the state where the axle drive apparatus is attached to the vehicle frame, the axle drive input member is supported by the axle drive case at a position spaced apart from the differential mechanism in the vehicle longitudinal direction; and
- the axle drive case side frame connecting part includes vehicle longitudinal direction first and second connecting parts for connecting one side of the axle drive case that accommodates the differential mechanism and the other side of the axle drive case that supports the axle drive input member to the vehicle frame, respectively.

10. The axle drive apparatus according to claim 9, wherein the adapter case side frame connecting part and the vehicle longitudinal direction second connecting part are provided with a vibration isolator.

\* \* \* \* \*